United States Patent [19]

Kitano

[11] 4,036,073
[45] July 19, 1977

[54] ELLIPTIC GEAR WHEEL

[76] Inventor: Akitoshi Kitano, Horinouchi 1403, Hayama, Miura, Kanagawa, Japan

[21] Appl. No.: 639,455

[22] Filed: Dec. 10, 1975

[30] Foreign Application Priority Data

Dec. 10, 1974 Japan .............................. 49-141673

[51] Int. Cl.² .......................... F16H 35/02; F16H 1/04; F16H 55/04; F16H 55/06
[52] U.S. Cl. ........................................ 74/393; 74/422; 74/437; 74/462
[58] Field of Search .................. 74/393, 422, 437, 462

[56] References Cited

U.S. PATENT DOCUMENTS

| 1,142,051 | 6/1915 | O'Connor | 74/437 |
|---|---|---|---|
| 2,788,567 | 4/1957 | Stibitz | 74/437 X |
| 2,861,635 | 11/1958 | Orr | 74/393 X |
| 2,973,658 | 3/1961 | Bishop | 74/393 X |
| 3,064,491 | 11/1962 | Bishop | 74/393 X |
| 3,206,997 | 9/1955 | Hardy | 74/437 X |
| 3,585,874 | 6/1971 | Ingham | 74/393 |
| 3,613,470 | 10/1971 | Arakawa | 74/393 |
| 3,721,131 | 3/1973 | Ing ham | 74/393 |
| 3,886,809 | 6/1975 | Kiss | 74/393 X |

*Primary Examiner*—Leonard H. Gerin

[57] ABSTRACT

An elliptic gear wheel or rotor having a predetermined pitch circle which includes longer and shorter radius and intermediary portions between said longer and shorter radius portions, the longer and shorter radius portions have teeth of a greater tooth pressure angle than that of teeth on the intermediary portion, and a transmission gear device including at least two identical elliptic rotors of the above type mounted in their respective support shafts in intermeshing relationship to each other.

A method of producing an elliptic rotor in which the pitch line of a cutter and the pitch circle of said rotor move relative to each other in rolling contact to cut teeth on the longer and shorter radius portions of the pitch circle with a greater tool pressure angle and cut teeth on the intermediary portion of the pitch circle with a smaller angle, the meshing faces of the shorter radius and intermediate portions of the pitch line are provided with backlash grooves extending in the axial direction of the rotor and facing the longer radius portion.

An apparatus for producing an elliptic rotor comprising a horizontal rotary cutter, a vertical rotary blank supporting shaft mounted on a carriage assembly movable horizontally with respect to the cutter, a rack integral with the carriage, a gear wheel mounted on a base member in meshing with said rack to move the rack as the gear wheel rotates and at least one elliptic rotor blank mounted on the shaft for rotation with the shaft in meshing relationship with the cutter.

13 Claims, 15 Drawing Figures

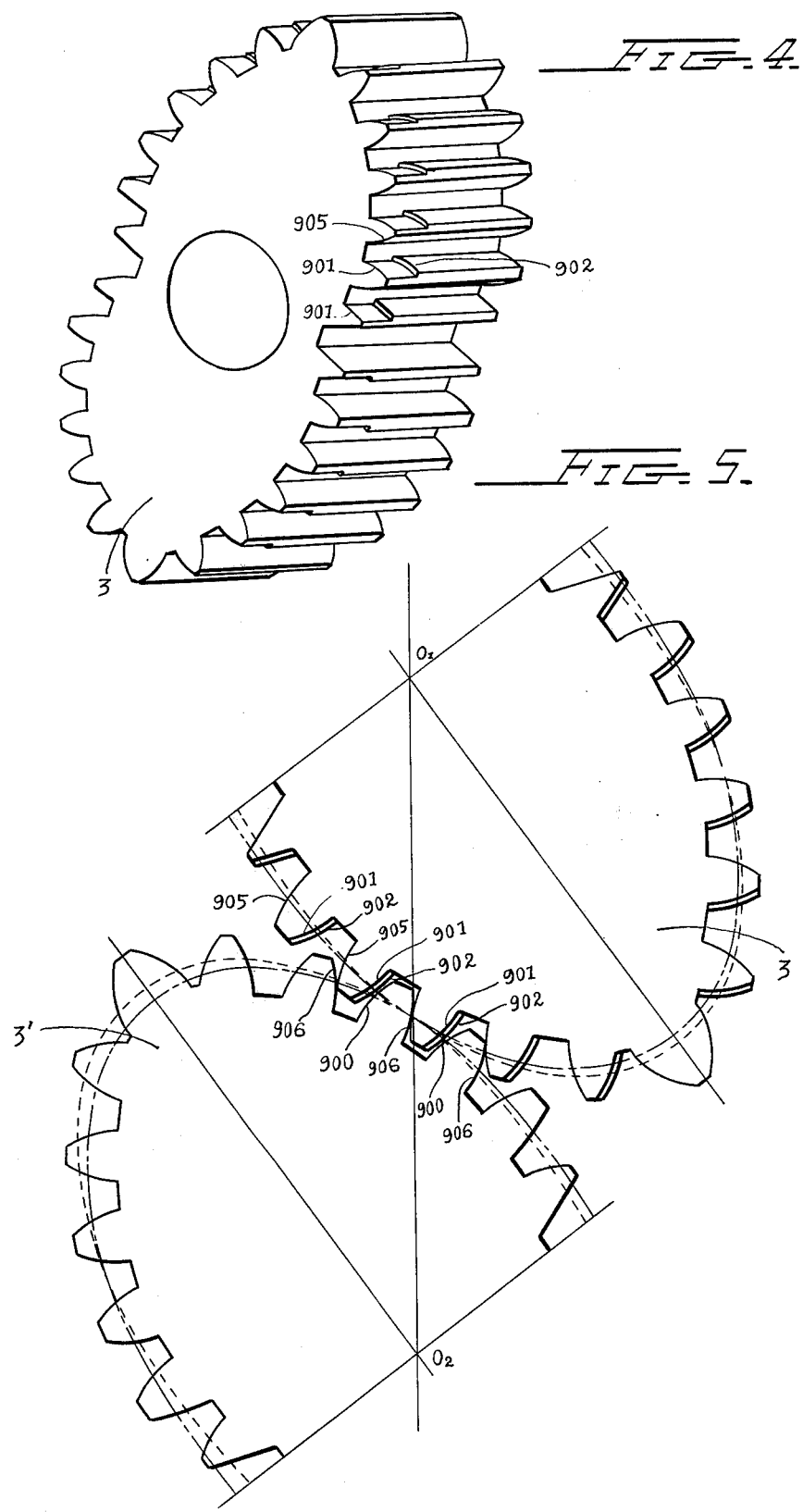

ELLIPTIC GEAR WHEEL

BACKGROUND OF THE INVENTION

This invention relates to a rotor in the form of a non-circular gear wheel or elliptic gear wheel for use in a pumping device, flow meter or the like and more particularly, to a transmission gear device which comprises at least a pair of such non-circular gear wheels provided in improved intermeshing relationship within the casing of the pumping device incorporating the gear device so that the pumping function of the pumping device can be substantially improved over that of the prior art pumping devices in the casing of which the conventional gear wheels are provided in intermeshing relationship. Furthermore, the present invention relates to a method for producing such non-circular gear wheels.

In a pumping device in which two identical non-circular gear wheels such as elliptic gear wheels having longer and shorter radius portions, respectively, the gear wheels will be referred to merely as "non-circular rotors" mounted in meshing relationship within the casing of the pumping device, when fluid is admitted at the inlet port of the pumping device and caused to flow through the interior of the casing to be discharged at the discharge port of the device, the rotors are caused to rotate in the opposite directions to each other and a very small clearance is defined between the inner surface of the casing the tips of the teeth on the longer radius portions of the rotors and between the adjacent inner surfaces of the casing side walls and the sides of the rotors, respectively, so that the fluid is prevented from flowing back and the meshing tooth faces of the two rotors provide fluid-tight seals on the flowing-in and flowing-out sides of the teeth on the rotors as seen in the rotation direction of the rotors to thereby perfectly the backflow of the fluid. Therefore, it is believed that the non-circular or elliptic rotor-type pumping device has a higher volumetric efficiency as compared with the other types of pumping devices employing conventional circular rotors. However, since the rotors rotate while repeating cycles of acceleration and deceleration, as the rotational speed of the rotors increases, the braking resistance developing due to inertia increases proportionally see, for example, applicant's earlier U.S. Pat. No. 2,897,765, issued Aug. 4, 1959 entitled "Driving Apparatus Comprising Modified Elliptic Gear Wheels." Especially, when the operating fluid employed in the pumping device is liquid, substantial vibration and nose take place in the pumping device due to the pulsation of the liquid. The higher the ratio of the rotation volume of the rotor to the delivery amount of the fluid in the rotor (the ratio will be now referred to as "delivery ratio") is, the higher is the volumetric efficiency of the pumping device. The pumping device employing the elliptic rotors of the type referred to above is characterized by that when the flatness of the rotors increases and the acceleration and deceleration of the rotors are substantially great, a high meshing pressure develops between the meshing teeth on the rotors with the maximum pressure angle approaching a predetermined stationary friction angle. And with respect to non-circular or elliptic pitch circles which make a given rolling contact, if the addendum of the teeth on the longer radius portions of the non-circular rotors is designed high, and in other words, if the longer radius portions of the rotors is to be provided with teeth having a great module, the delivery ratio of the rotor will become high, but the so-called interference which cause undercut develops as the roots of gear teeth resulting in shortening of the service life of the rotors. And when the non-circular or elliptic rotor is so designed that the rotor provides a great tool pressure angle to reduce the meshing pressure load on the meshing tooth faces and eliminate the undercut at the tooth root, a predetermined maximum meshing pressure load on the teeth of the intermediate portion between the longer and shorter radius portions of each of the non-circular rotors exceeds a predetermined critical value, as one or both of the meshing rotors wear away even by a slight degree the rotors will disengage from each other to the extent that they will not be able to rotate. Although the delivery ratio of a non-circular or elliptic pitch circle is in inverse relationship to the ratio of the outer periphery radius of the rotor to the distance between the centers of the rotors, it has now been found that when the teeth on the longer and shorter radius portions along the non-circular pitch circle are designed to be a shape having a greater pressure angle on the pitch circle and the teeth on the intermediate portion between the longer and shorter radius portions is designed to be a shape having a smaller pressure angle, no undercut is developed at the roots of the teeth and a higher delivery ratio can be obtained in the associated rotor to thereby develop a maximum meshing pressure load having a moderate value.

The pitch circle of a non-circular or elliptic gear wheel or rotor is defined as a curve along which the rotor rolls about the center of rotation as its axis without slipping and the curve obtainable by each of the following formulas can be considered as such a curve: that is, the curve obtained when it is assumed that at the polar coordinates, $a$, $b$ and $c$ are numbers relating to the length. $d$ is a positive number from zero to 1 inclusive, $x$ is an independent variable and $n$ is an optical integer, then the length of radius vector $\rho_1$ is obtained by the following formula:

$$\rho_1 = a + \cos nx \left\{ \frac{c \cdot d^2 |\sin^2 nx|}{(1 - d^2 \cos^2 nx)^2} - b \right\} \tag{1}$$

and when $\mu$ is a number determined by the above-defined $a$, $b$, $c$ and $d$, then the directional angle $\theta_1$ is obtained by the following formula:

$$\theta_1 = \frac{1}{\mu} \int \frac{dx}{\rho_1} \tag{2}$$

and the curve engaging the first curve and obtained when it is assumed that at the polar coordinates, the length of the radius vector $\rho_2$ is obtained by the following formula:

$$\rho_2 = a - \cos nx \left\{ \frac{c \cdot d^2 |\sin^2 nx|}{(1 - d^2 \cos^2 nx)^2} - b \right\} \tag{3}$$

and the directional angle $\theta_2$ is obtained by the following formula:

$$\theta_2 = \frac{1}{\mu} \int \frac{dx}{\rho_2} \qquad (4)$$

Since the curves of the formulas (1) through (4) inclusive satisfy the above-mentioned conditions, when a blank is cut along the curves referred to hereinabove by a gear cutter having a predetermined or suitable module to form teeth on the blank, a desired non-circular or elliptic gear wheel on be obtained. The thus obtained two identical gear wheels are mounted in intermeshing relationship as the rotors within the casing of a pumping device, flow meter or the like device and in the device, the flow rate flowing through the device is determined by utilizing a crescent clearance defined between the inner surface of the casing and rotors as the measure. In such a case, assuming that $a$ is a constant in the formulas (1) and (3), when the values of $b$, $c$ and $d$ are selected as being great, the ratio of the shorter radius portion to the longer radius portion along the pitch circle in each rotor (the ratio will be referred to as "flatness" hereinafter) is great and thus, the delivery ratio of the pumping device employing such rotors is increased. In a pumping device or flow meter, the greater the delivery ratio is, the smaller the ratio of the fluid leakage volume to the volume of the admitted fluid is and in other words, the fluid leakage volume is small to reduce difference between the admitted fluid volume and delivered fluid volume and the frictional resistance between the inner surface of the side walls of the pumping device casing and the side surfaces of the rotors resulting in improvement of preciseness of the metering device such as a pumping device. However, when a gear tooth is to be formed on a blank by cutting along the conventional non-circular or elliptic pitch circle, if the tooth is with provided a tooth shape having a module respectively greater with respect to the selected circle, the non-circular circle described by the tips of the teeth on the longer radius portion of the rotor pitch circle will become great to provide a rotor having a great delivery ratio. However, since the cuvature of the pitch circle on the longer radius portion is great, interfere occurs at the roots of the teeth on the longer radius portion to the extent that an undercut will be formed. And when the tooth cutting edge shape of a gear cutter is designed to have a small tool pressure angle, although the width of the tooth tips along which the above-mentioned non-circular outer periphery circle is described will become wide to thereby provide effects which prevent leakage of fluid through the clearance defined between the tips of the teeth on the longer radial portion of the rotor and the inner surface of the casing, interference occurs at the tooth roots on the longer radius portion of the rotor having the great curvature.

SUMMARY OF THE INVENTION

Therefore, one of the principal objects of the present invention is to provide a non-circular or elliptic gear wheel which effectively eliminates the disadvantages inherent in the prior art gear wheels while preserving the advantages obtainable by the prior art gear wheels.

Another principal object of the present invention is to provide a method for producing such a gear wheel.

A further principal object of the present invention is to provide an apparatus for producing such an elliptic gear wheel which is simpler in construction and less expensive in production.

According to one aspect of the present invention, there has been provided a non-circular gear wheel or an elliptic rotor having a pitch circle which includes longer and shorter radius portions and an intermediary portion positioned between the longer and shorter radius portions and in which the teeth on the longer and shorter radius portions have a tooth pressure angle different from that of the teeth on the intermediary portion and one face of the meshing tooth faces of each of the teeth on the shorter radius and intermediary portions is provided with a backlash or trapping prevention groove or clearance extending in the axial direction of the rotor and facing the longer radius portion.

According to another aspect of the present invention, there has been provided a transmission gear device incorporating at least two elliptic rotors of the above type in such a meshing relationship that the path circles of the rotors engage each other in rolling to provide the teeth on the longer and shorter radius portions with a first predetermined tool pressure angle and provide the teeth on the intermediary portion with a second predetermined second tool pressure angle in each of the rotors whereby the addendum of the teeth on the longer radius portion having a greater curvature that than the rest in the pitch circle is increased and the limit of maximum meshing pressure angle of the teeth on the intermediary portion is maintained below a predetermined value.

According to another aspect of the present invention, there has been provided a method for producing the elliptic rotor of the above type in which an elliptic rotor blank having a predetermined pitch circle and a tool cutter having a predetermined pitch line along with cutting edges of different tool pressure angles adapted to cut teeth on the longer and shorter radius portions and the intermediary portion of the pitch circle of the rotor blank are rotated with relative to each other with the pitch circle and pitch line in rolling contact to thereby provide a first predetermined tool pressure angle to the longer and shorter radius portions of the pitch circle of the rotor and a second predetermined tool pressure angle to the intermediary portion of the pitch circle of the rotor.

According to another aspect of the present invention, there has been provided an apparatus for producing an elliptic rotor of the above type which comprises in combination a horizontal rotary tool cutter, a vertical rotary blank supporting shaft having the lower end secured to a carriage assembly having an integral rack and movably mounted on a base member, a drive wheel mounted on the base member in engagement with the rack and at least one elliptic rotor blank mounted on the blank supporting shaft in rolling engagement with the tool cutter to be cut teeth thereon by the tool cutter.

The above and other objects and attendant advantages of the present invention will be more readily apparent to those skilled in the art from a reading of the following detailed description in conjunction with the accompanying drawings which show several preferred embodiments of the invention for illustration purpose only, but not for limiting the scope of the same in any way.

BRIEF DESCRIPTION OF THE DRAWINGS

FIG. 4 is an explanatory view which shows trapping prevention grooves provided on the faces of teeth of a rotor where no face pressure load is applied;

FIG. 5 is an explanatory view which shows the intermeshing relationship between the teeth on cooperating rotors;

PREFERRED EMBODIMENT OF THE INVENTION

Figure 1:
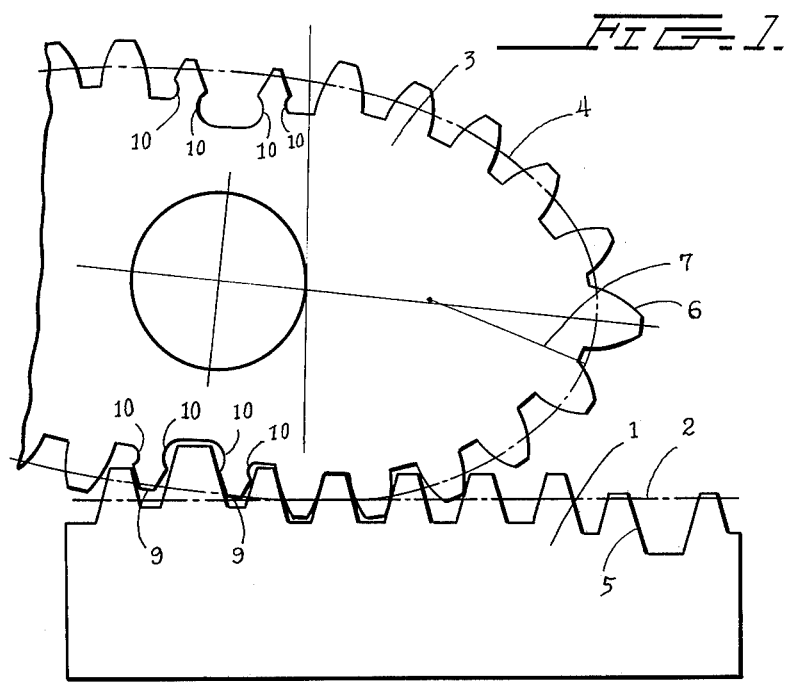
FIG. 1 is an explanatory view which shows how undercuts are formed when a non-circular or elliptic gear wheel is produced by forming tooth on a blank by a cutting tool having a plurality of cutting edges of a uniform tool pressure angle.
Figure 2:
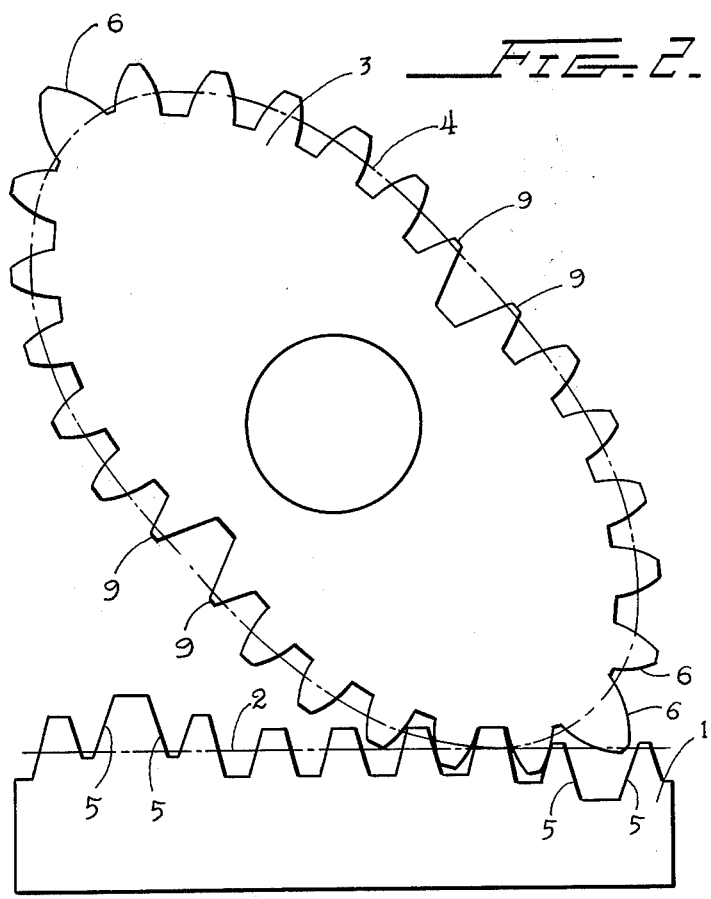
FIG. 2 is an explanatory view which shows one gear tooth cutting operation in which a blank is formed with teeth by a gear cutter having cutting edges with the tool pressure angle of 20° for the longer and shorter radius portions of a non-circular or elliptic pitch circle and the tool pressure angle of 14.5° for the intermediate portion between the longer and shorter radius portions of the pitch circle, respectively.

The present invention will be now described in detail referring to the accompanying drawings and more particularly, to FIG. 1 thereof. In FIG. 1, a rack cutter 1 is formed with cutting edges 5 in stepwise profile-shifted with respect to the pitch line 2 thereof with a minus profile shift ($=x$) by the so-called profile-shifted gear process and adapted to cut teeth 6 on the portion having a greater curvature or longer radius portion along the pitch circle 4 of previous mentioned curve or similar curves of a rotor blank 3 with the tool pressure angle of 14.5° with respect to the pitch line 2 of the cutter 1, for example so as to provide a gear wheel or rotor having a large circumference. In the thus obtained gear wheel or rotor, the length of radius of curvature 7 of the greater curvature portion is the shortest of those of the rest portions of the rotor. However, when the teeth 6 on the longer radius portion are stepwise profile-shifted with a plus shift ($+x$), the addemdum of the teeth 6 can be substantially increased and since the shift amount is in excess of the undercut limit factor of profile shift (30 $- z/32$) (wherein z is the number of teeth expressed in terms of $z$ ($2\rho_e/M$) when the radius of curvature of the longer radius portion is $\rho_e$ and the module is $M$), no interference or undercut occurs. However, in the gear wheel or rotor referred to above, when the shorter radius portion has the radius of $\rho_f$, the number of teeth $z = (2\rho_f/M)$ is obtained, but since the teeth 9 on the shorter radius portion become lower than the undercut limit factor of profile shift, undercuts 10 occur on the teeth on the shorter radius portion to render the meshing conditions on the shorter radius portion teeth unsatisfactory. In order to eliminate the interference or undercut or undercuts, according to the present invention, as more clearly shown in FIG. 2, only the gear shape of the cutting edges 5 of the cutter 1 adapted to cut teeth on the shorter radius portion is designed to have a great tool pressure angle. For example, when the cutting edges 5 are designed to cut teeth 9 on the pitch line of shorter radius portion which is partially straight, of the blank 3 with the angle of 20°, the value of the undercut limit factor of shift will be ($14 = z/17$) to substantially alleviate the interference and eliminate occurrence of undercut or undercuts at the roots of teeth resulting in satisfactory meshing conditions.

It has been known that the performance of a pumping device and particularly, of a flow meter is substantially affected by the configuration of rotors employed therein. For example, assuming that the rotors have the axial length of W, cross-section area of S, radius of rotation of $\rho_K$, outer diameter of $2\rho_R$, length of the longer radius portion along the pitch circle of $\rho_l$, length of the shorter radius portion along the pitch circle of $\rho_s$, maximum meshing pressure angle at the intermediary portion along the pitch circle of $\alpha$ and rotation area of $S_s$, the momentum of inertia of the rotor $$I = SW \sigma \rho_R^2 \ (\sigma \text{ is mass}),$$

the delivery rate per rotation ($V_r$) is obtained by seeking the ratio by the formula $V_r = S_s WY$ obtainable by the formula wherein the delivery ratio $$Y = \frac{\pi \rho_R^2 - 4S}{\pi \rho_R^2 \left(1 - \frac{1}{180°} \cos^{-1} \frac{a}{\rho_R}\right) + a\sqrt{\rho_R^2 - a^2}},$$

the ration rate
$R = (S_s W/V_r)$ and the maximum meshing pressure angle $$K = \frac{IR^2 \cdot \sec \alpha_{max}}{W}.$$

That is, the greater the flatness of the rotor is and the smaller the maximum pressure angle is, the longer the service life of the rotor $L_f = (1/KR)$ is. Furthermore, the upper limit of permissible number of rotations Rmax $$\left(R_{max} = \sqrt[3]{\frac{W\alpha_{max}}{I}}\right)$$

at acceleration and deceleration is restricted. Thus, the upper limit of maximum flow rate Vmax (Vmax =

VrRmax) is increased in proportion to decrease in the momentum of inertia as in the case of the service life. And assuming that the width of the tips of teeth on the longer radius portion of an elliptic rotor and the inner surface of the casing of a pumping device where the tooth tips contact is $W$, the addemdum of teeth on the longer radius portion is $h$ and the profile shift amount is $Y_{so}$, then, the torque of the rotor.

$$T = (h + y_{so})\left(\rho_l + \frac{h + y_{so}}{2}\right) +$$

$$\left\{\frac{1}{2}(\rho_l^2 - \rho_s^2) + (h + y_{so})\left(\rho_l + \frac{h + y_{so}}{2}\right)\right\}$$

and the minimum flow rate $Vmin = (I R^2/wt)$ Thus, the greater the flatness of the rotor is, the higher the addemdum of teeth on the longer radius portion is and the wider the tooth tip width is, the more precisely the flow rate can be metered.

Therefore, when the rotors are designed to have the pitch circles obtained by the above-mentioned formulas (1) through (4) as envisaged by the present invention, the teeth on the longer and shorter radius portions in each rotor are in plus and minus profile-shifted disposition, respectively and have a higher tool pressure angle on the longer and shorter radius portions than the teeth on the intermediary portion between the longer and shorter radius portions, the rotors have a great tooth thickness, a low maximum meshing pressure and a large circumference as compared with the distance between the axes of two rotors (a great delivery ratio). Furthermore, when the width of tips of the teeth on the longer and shorter radius portions is made wide, fluid leakage can be limited to a minimum value to thereby provide an improved pumping device which has a high volumeric efficiency and is less affected by acceleration and deceleration.

Figure 3A:
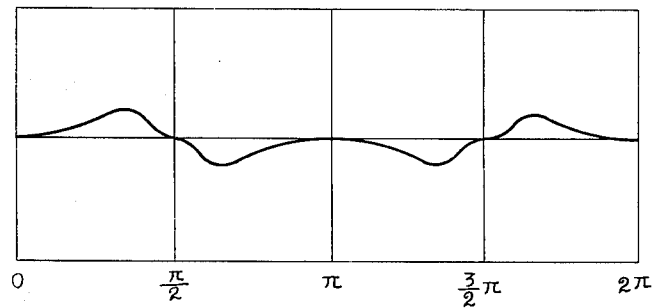
FIG. 3A is a graph which shows variation in pressure load applied on the meshing faces of teeth on intermeshing rotors or gear wheels rotating at a high speed.
Figure 3B:
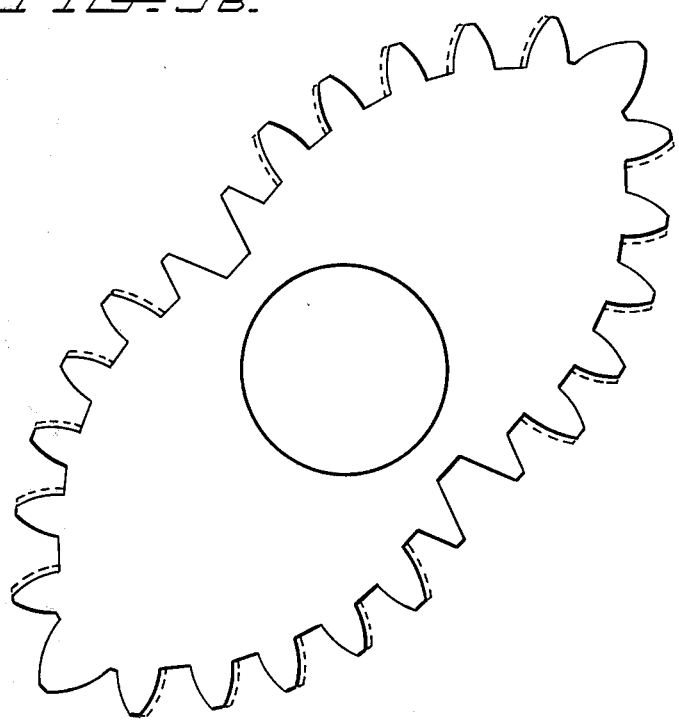
FIG. 3B is an explanatory view which shows wear conditions on the faces of meshing teeth on a rotor or gear wheel caused by meshing pressure load applied thereon.

In the above-given formulas 1 through 4 inclusive, when $a = 3b$, $c = 8$ and $d = 0.1$, for example, the angle defined by the line intersecting the longer axes of the two rotors, that is, the pressure angle will be and when the cutter is formed with cutting edges having the tool pressure angle of 14.5°, if the rotor is to be formed with more than 46 teeth, even if the undercut limit factor of shift is set at a permissible maximum value, undercut or undercuts will inevitably occur at the tooth root or roots. And when the tool pressure angle is set as being 20°, no such undercut will occur, but on the other hand, the maximum meshing pressure anle will be 52° which will result in excessively high meshing pressure and cause premature wear on the meshing tooth faces. In such a case, when foreign matter is entrapped between the meshing tooth faces, the rotation of the rotors will be hindered to thereby reduce the performance of the pumping device in which such rotors are employed. Therefore, when the tool pressure angle on the intermediary portion between the longer and shorter radius portions along the pitch circle is set as 14.5°, for example, the value of the maximum meshing pressure angle can be reduced and the meshing pressure on the meshing tooth faces where a designed maximum value of momentum of inertia is applied can be also reduced. However, in such a rotor, the intermediary portion will have a small curvature and when the teeth on the portion have a small tool pressure angle, trapping will inevitably occur. Such phenomenon develops more conspicuously in a rotor have a relatively small number of teeth. On the other hand, the wider the width of tooth tips of the longer radius portion of in a rotor is, the less the fluid leakage between the peripheral surface of the rotor and the inner surface of the pumping device casing is and thus, it is preferable to design the width of teeth on the longer radius portion as much as greater. However, since the great the absolute value of module is, the greater the trapping action between meshing teeth is, it is necessary to prevent resistance by trapping during the rotation of the rotor. As shown in the graph of FIG. 3A, during the rotation of a rotor at a high speed, inertia is applied on the meshing tooth faces of the teeth of the rotor in the direction outwardly of the longer radius portion of the rotor due to the rotation angle of the rotor and as shown in FIG. 3B, since teeth on the rotor wears away after a prolonged time period of the operation of a pumping device employing such rotors, when backlash or trapping prevention grooves or clearances 901 are provided on the tooth faces to compensate for such wear as shown in FIG. 4, the rotor can rotate smoothly and quietly without being subject to resistance against such rotation even after the rotor has worn somewhat. When such a backlash or trapping prevention groove or clearance 901 is provided extending by a distance from 10 to 30% on one of the opposite faces of each tooth in the axial direction of the rotor, trapping shock can be effectively avoided. Since such grooves are not provided on the other faces of teeth on the meshing rotors, the teeth fully intermesh on such faces and the whole area of the tooth faces is subjected to inertia, and thus, the service life of the rotor will not be affected thereby. Even when the effective meshing area of the face of each of the teeth is reduced to 90–70% of the entire area of the tooth face by the provision of such backlash or trapping prevention groove in the axial direction of the rotor, the tooth face can sufficiently maintain its intermeshing relationship to the mating tooth face and the pumping device employing such rotors can perform its operation satisfactorily for a prolonged time period of rotation at a high speed.

Referring now to FIG. 5, one of the rotors 3 is shown as being provided on one face 902 of each, of the teeth, with such an axially extending backlash groove 901 which selectively cooperates with one face 900 of each of the teeth on the other rotor 3' to maintain a backlash so that fluid entrapped when the tooth face 902 has contacted the mating tooth face 900 can be allowed to escape through the groove 901. The rotors 3 and 3' are adapted to rotate under fluid pressure. When the rotors 3 and 3' are desired to be rotated at a high speed (or when the fluid flows at a high flow rate), one of the rotors rotates or is rotated by the other rotor by means of the tooth faces 905 and 906 of the rotors, respectively. When the rotors rotate in the manner mentioned above, almost no face pressure is applied on the tooth faces 900 and 902 and thus, even when the tooth faces 902 are formed with backlash grooves or clearances 901 extending by a short distance in the axial direction of the rotor and the meshing area of the tooth faces is reduced, the service life of the rotor will not be adversely affected.

The principle of the present invention has been described in connection with the cases in which a simulated involute gear tooth form is cut by gradually shifting the center line of gear teeth in minus and plus phases with, respectively, respect to a non-circular or elliptic pitch circle or a tooth form having a particular involute curvature in which the center line of gear teeth is shifted stepwise, by the present invention is also applicable to the formation of other types of tooth forms without departing the spirit of the invention. The shape of the backlash grooves for escaping trapped fluid or relieving trapping pressure can be also varied. Furthermore, the present invention is not limited to rotors having mesh teeth of profile-shifted forms with the same module based on the theory referred to hereinabove, but also can be applied to non-circular or elliptic rotors which include meshing teeth having different widths of teeth on the longer and shorter radius portions along the pitch circle and a tool pressure angle greater than that of the teeth on the intermediary portion along the pitch circle. The non-circular or elliptic rotors having different tooth forms along a pitch circle can be also optionally selected without departing from the present invention provided that the principle of the invention, in which the addendum of teeth on the longer radius portion adjacent to the inner surface of the casing of a pumping device is increased by specific means, the width of the tooth tips is designed wide and the meshing pressure angle of the teeth on the intermediary portion is reduced to provide smooth meshing action, is applied.

In this way, when the addendum of teeth on the longer radius portion is substantially increased by a combination of the specific profile shifting theory on the circumference relative to the pitch circle and different tool pressure angles in a non-circular rotor, when such rotors are employed in a flow meter, the sensibility in response to a given minimum flow through the flow meter can be increased or the volumetric efficiency of the flow meter can be increased. However, with such an arrangement, since resistance caused by trapping acts as a braking force to hinder the operation of the meter, in order to eliminate the difficulty, according to the present invention, backlash or relief grooves are provided on the meshing tooth faces. In addition, according to the present invention, a device adapted to cut the relief grooves in a relatively uniform and simple way has been provided.

Figure 6:
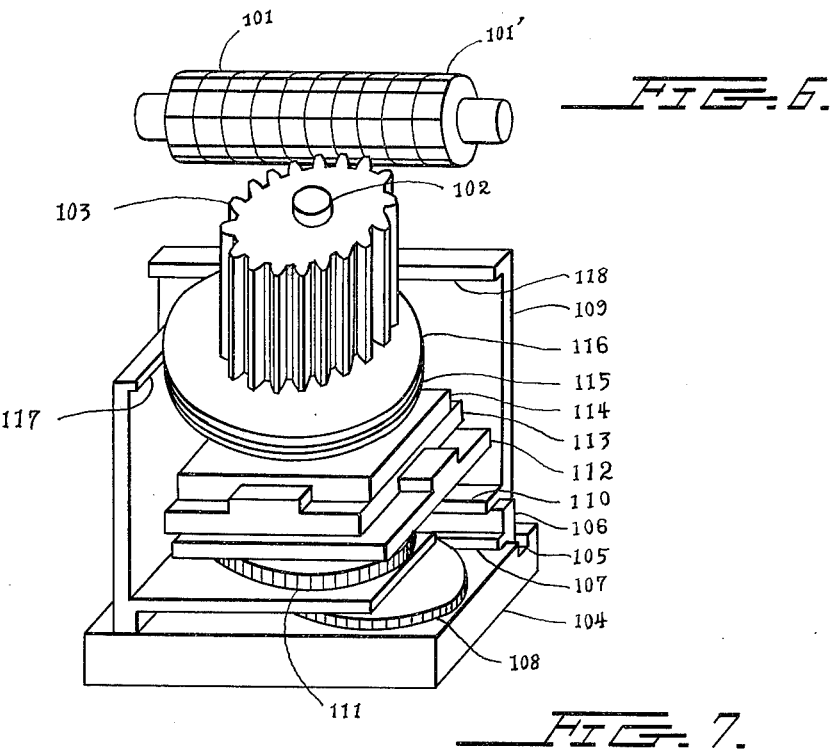
FIG. 6 is a perspective view of one typical gear cutting machine which is suitably employed in carrying out the gear cutting method of the present invention.
Figure 7:
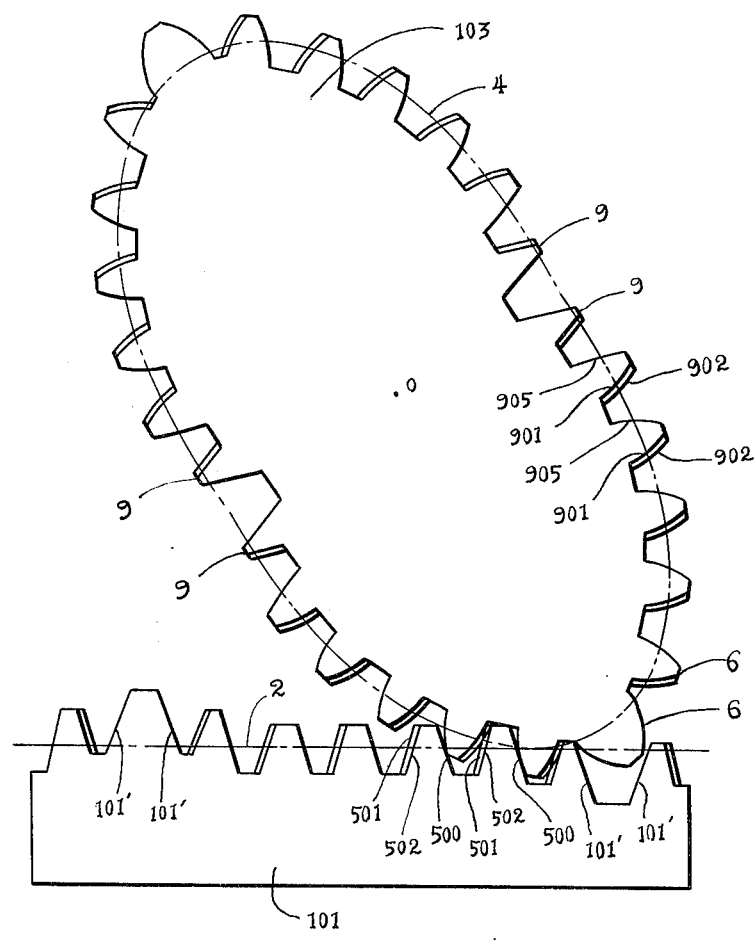
FIG. 7 is an enlarged fragmentary view of FIG. 6 showing the tooth cutting function of the gear cutter with respect to the blank to be formed with teeth thereon.

FIG. 6 illustrates one example of such devices and the device will be now described referring to FIG. 6 in conjunction with FIG. 7. As shown, a rotary hob cutter 101 extends horizontally having the support shaft suitably journalled and has a plurality of cutter edges 101' radially disposed thereabout for rotation with the shaft and an elliptic blank 103 is disposed about a vertical shaft or mandrel 102 which moves leftwards and rightwards relative to the hob cutter in frictional engagement with the cutter edges 101' for movement leftwards and rightwards while rotating.

The lower end (not shown) of the shaft or mandrel 102 is secured to a carriage 106 adapted to move horizontally along a guide groove 105 formed in a base 104 and having an integral rack 107 so that the gear blank 103 moves rotationally along the hob cutter in cutting engagement therewith with the pitch line 2 of the cutter and the pitch circle 4 of the blank 103 lying on the same plane. The rack 107 integral with the carriage 106 engages a circular gear wheel 108 which is in turn rotatably mounted on the base 104 so that the rotation of the circular gear wheel 108 in one or the other direction moves the carriage 106 leftwards and rightwards in a horizontal plane. The base 104 has an integral frame 109 extending uprightly therefrom and the frame also has an integral rack 110 extending horizontally from the lower end portion of the frame. A circular gear wheel 111 is rotatably mounted on the carriage 106 for meshing with the rack 110. The gear wheel 111 transmits its rotation through universal couplings 112, 113 and 114 to cams 115 and 116, respectively, which are in turn urged against a vertical guide plate 117 secured to the carriage 116 and a guide plate 118 integral with and horizontally extending from the upper end of the frame 109, respectively, by means of springs and the like means (not shown) whereby as the circular gear wheel 108 rotates, the gear imparts a rolling movement to the non-circular gear wheel blank 103 so as to cut simulated involute tooth faces in the blank 103. In addition, according to the present invention, the non-circular or elliptic gear wheel or rotor can be cut by providing different tool pressure angles to the cutting edges of the pinion cutter in a gear cutting machine, providing a radially profile-shifted, progressively profile-shifted or partially profile-shifted contour or employing a pinion cutter similar to the abovementioned rack cutter, but having cutting edges of substantially reduced or increased width without departing from the spirit of the present invention.

Figure 8:
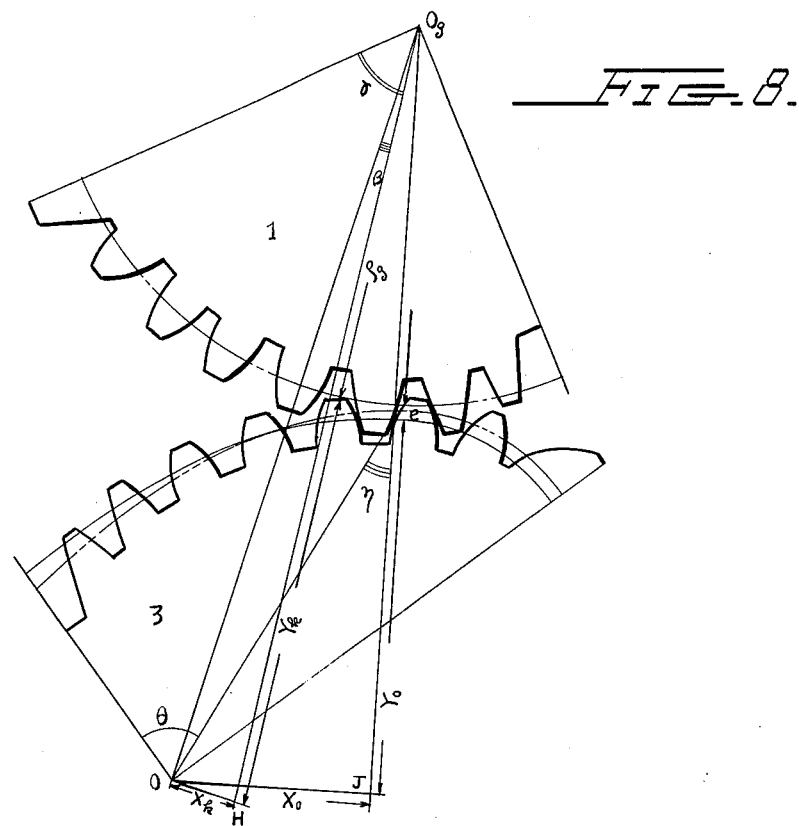
FIG. 8 is an explanatory view showing relative movement between the pinion cutter in a gear cutting machine and a blank to be processed by the cutter.
Figures 9A, 9B:
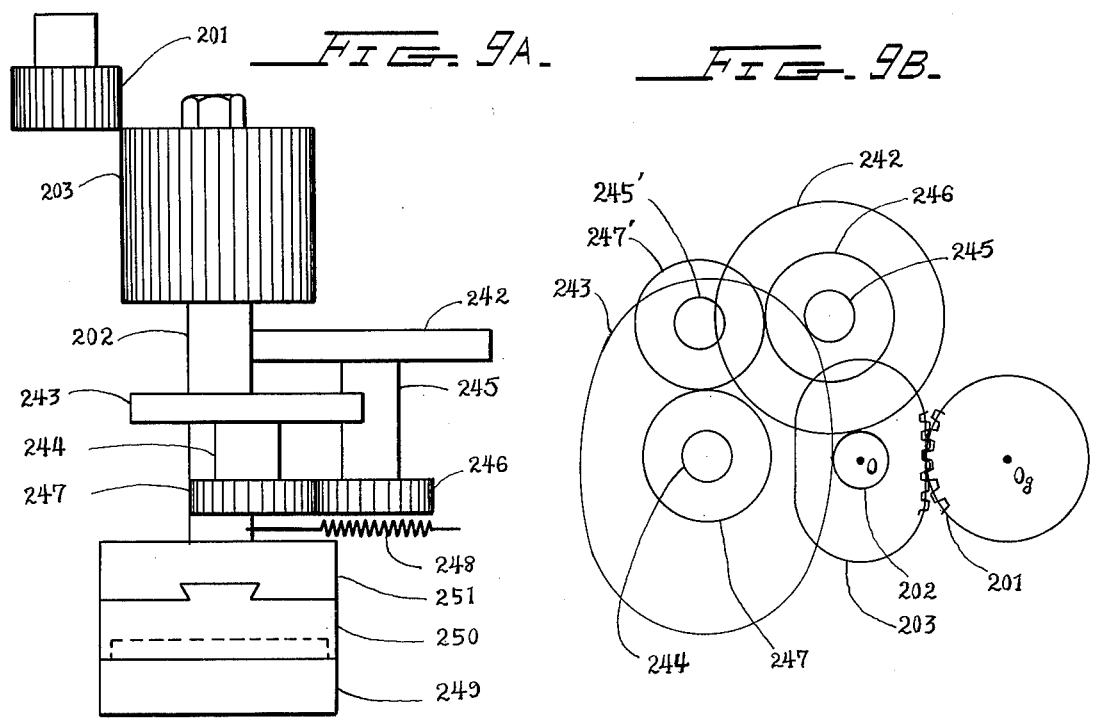
FIGS. 9A and 9B are explanatory schematic views showing the manner in which the blank support shaft is rotated by a cam, respectively.

As shown in FIG. 8, for example, the center 0 of a non-circular or elliptic gear wheel blank 3 is allowed to displace with respect to the center Og of the pinion cutter 1 by the distance of $\overline{OgH}$ in the vertical direction and by the distance of $\overline{OH}$ in the horizontal direction, respectively. The pinion cutter 201 of FIG. 9 includes cutting edges for cutting the longer radius portion of the non-circular or elliptic gear wheel blank 203 at the tool pressure angle 20°, in minus profile-shifted phase cutting the shorter radius portion of the blank in minus profile-shifted phase and cutting the intermediary portion of the blank at the tool cutting angle 14.5°, respectively as in the case of the rack cutter of FIG. 2. The supporting shaft or mandrel 202 for the blank 203 is imparted rotation from a drive means (not shown) through universal couplings 249, 250 and 251. The blank supporting shaft 202 is urged against cams 242 and 243 mounted shafts on 245 and 244 support gear wheels 246 and 247, respectively, which gear wheels are adapted to be driven in synchronization with a turn table 249 by a drive means (not shown) whereby the blank 203 is imparted thereto the movement as shown in FIG. 8 and the cams 242 and 243 are imparted thereto the movements as shown by $\overline{OgH}$ and $\overline{OH}$ in FIG. 8. The rolling and shift amount $e$ of the pitch circles obtained by the above-mentioned formulas (1) through (4) are obtained and the shift amount is obtained by the formula:

$$e = e_h(-\cos nx) \, |\cos^m nx| \tag{5}$$

wherein $e_h$ is a maximum shift amount and $m$ is a positive integer. Assuming that $\overline{OJ} = Xo$, $\overline{OgJ} = Yo + \rho_g$ and the radius of the pinion cutter is $\rho_g$, then the position of the blank 203 with respect to the axis $\overline{OgH}$ of the gear cutting machine at the Cartesian coordinates is expressed by:

$$Xh = Yo \, \text{cosec} \, \gamma \cdot \sin \beta \tag{6}$$

$$Yh = Xo \, \text{cosec} \, \gamma \cdot \cos\beta - \rho_g \tag{7}$$

and therefore, when the shapes of the cams 42 and 43 are determined by adding the values of the formulas (6) and (7) to the basic circle of the cams, respectively, the gear teeth cut on the blank will have a shape which allows the complete gear wheel or rotor to move satisfactorily. The present invention contemplates not only to cut the body of a gear wheel or rotor, but also to cut a backlash groove in one face of a tooth by a desired or necessary width in the axial direction of the gear wheel by rotating pinion cutter by an angle corresponding to the width of the backlash groove from a predetermined position of the cutter and to cut the backlash or trapping prevention groove in one face of a tooth or teeth on a gear wheel blank by simultaneously rotating the blank and a small cutter with a portion of the cutter corresponding to the size of the groove to be cut protruding into the pitch circle of the blank. When the meshing faces of teeth on the rotor are formed of materials having high hardness such as nitriding steel, high carbon steel or subjected to high frequency-hardening treatment and the body of the rotor is preferably formed of light weight material such as light alloy having backlash or trapping prevention grooves in selected faces of teeth on the rotor to provide a rotor which rotates with relatively less vibration whereby a pumping device incorporating such rotors can be operated at a relatively low speed.

Figure 10A:
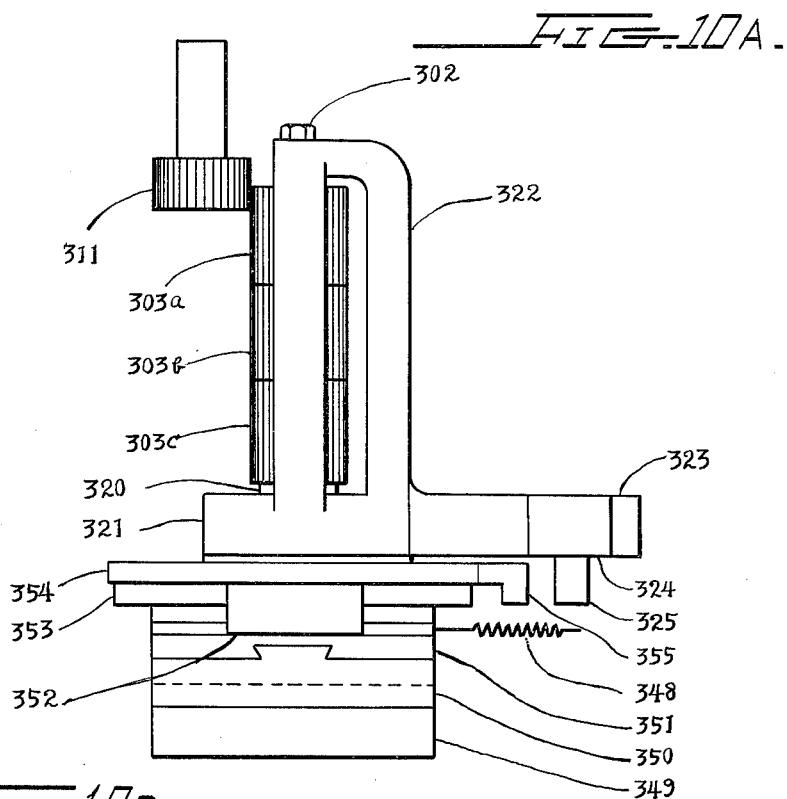
FIG. 10A is a fragmentary elevational view of the blank holding arrangement of another type of gear cutting machine.
Figure 10B:
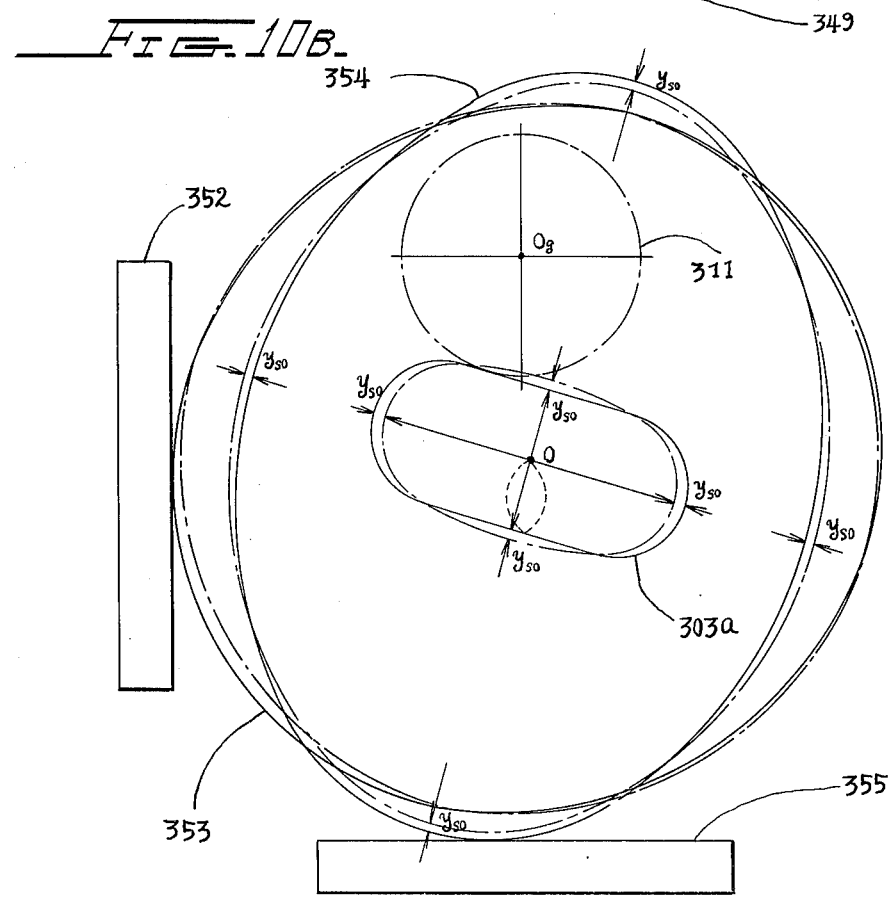
FIG. 10B is an enlarged schematic view showing the gear tooth cutting operation in said gear cutting machine as shown in FIG. 10B.

According to the present invention, since the rotor is characterized by that the ratio of the longer radius to the shorter radius in the pitch circle of a rotor is greater and the deddendum of the teeth on the longer radius portion is greater and therefore, the shaft of the rotor has a relatively small diameter. Thus, the blank supporting shaft is insufficiently thin to stand against cutting stress applied on the blank by the cutting tool and therefore, if the shaft is a cantilever shaft, the shaft tends to displace. The blank shaft is required to be imparted thereto the rolling movement of the shaft of the cutting tool or the rotational movement comprising the complex action of such rolling movement and profile shifting amount of the rotor. However, when the rotor has a long axial length and a plurality of rotors are mounted on the same shaft for improving cutting efficiency, the rotor supporting shaft is required to be supported at the opposite ends and in order to precisely impart the above-mentioned complex rotation to the shaft, the opposite ends of the shaft are preferably driven by cams, links or the like means. And as shown in FIG. 10, for example, universal couplings 350 and 351 are suitably mounted on a turn table 349 and a shaft 302 extends uprightly from and secured at the lower end to the coupling 351 on which a plurality of gear wheel blanks 303a, 303b and 303c are mounted one upon another. Cams 354 and 353 are provided to rotate in abutment against guide plates 352 and 355, respectively, under the biasing action of a spring 348 to thereby impart the above-mentioned complex movement to the blank supporting shaft 302. An annular wheel 320 is coaxially mounted adjacent to the lower end of the shaft 302 and similarly, a ring 321 is also coaxially mounted at the extreme lower end of the shaft and has a frame 322 which extends upwardly from the ring so as to hold the upper end of the shaft 302 in position. A handle-shaped support bar 323 is provided and embraced by a slide wheel 324 so that the gear wheel blank is normally rotated in opposition to cutting resistance offered by the cutter 311 without displacing. And the device of FIG. 10 is characterized by that the device is simple in construction and operation and that the complex movement comprising the relative movement between the pitch line of the cutter and the pitch circle of the blank and profile shifting can be obtained by the above-mentioned cam arrangement.

The present invention contemplates to provide not only the method for producing rotors so as to prevent formation of undercuts referred to above, but also the methods for producing such rotors by extruding and casting within its broader aspect. The appended claims also include the methods for preparing separable molds which are separable and tapered in the conventional manner for producing rotors such as internal gears so that the cast rotors can be easily taken out of the molds after the molding of the rotors.

Figure 11:
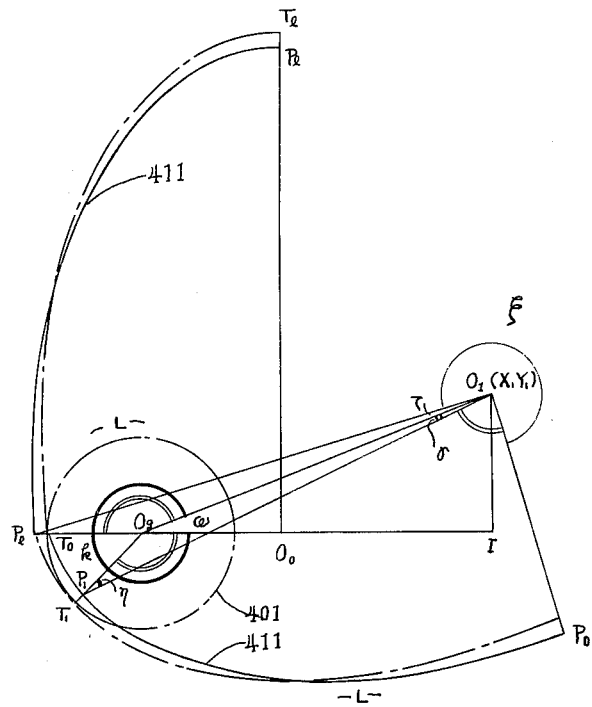
FIGS. 11 and 12 are explanatory views showing the manner in which a gear wheel or rotor is formed by casting, respectively.
Figure 12:
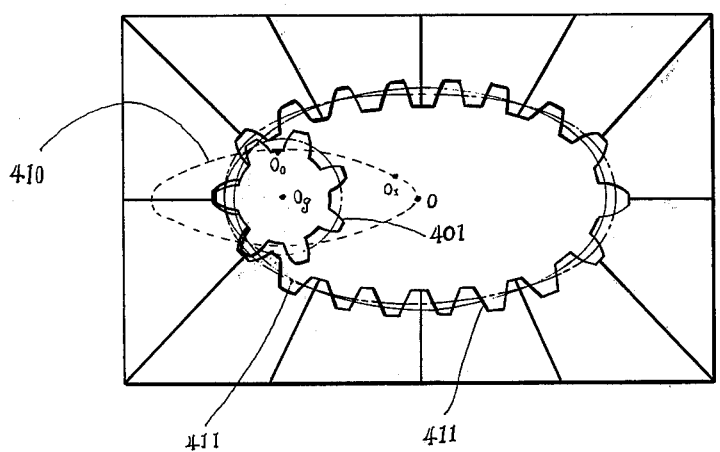

FIG. 11 illustrates one example of mold cutting methods. The cutter 401 may be a pinion cutter, having profile-shifted tooth forms or a specific cutter comprising tooth forms at least two different tool pressure angles in combination along the pitch circle and the cutter has the center $O_g$. The cutter cuts a mold blank 411 having the center $O_1$ which displaces as the cutting operation progresses. When the cutting operation has completed, the distance $\overline{O_o O_g}$ between the centers of the cutter and blank changes to the distance $\overline{O_1 O_g}$ describing the dotted curve 410 as seen in FIG. 12. In order to increase the delivery ratio of a pumping device employing such rotors as produced by the present invention, the flatness of the non-circular or elliptic pitch circle is increased and the maximum meshing angle is designed small as much as possible. And in order to increase only the height of the ends of teeth on the longer radius portion and increase only the dedendum of teeth on the shorter radius portion, the teeth on the two portions are formed as internal gear tooth forms. However, according to the present invention, interference or undercut at the addendum can be eliminated or the ratio of the circumference to the center distance (the distance between the centers of two rotors) can be increased to a permissible upper limit by imparting a maximum negative or positive profile shifting to the shorter radius portion (at the same time, the teeth on the longer radius portion is profile-shifted by the corresponding amount in plus phase), whereby cooperating rotors rotate in smooth meshing relationship and the delivery ratio of the pumping mechanism employing such rotors can be increased to a permissible maximum value. As shown in the following table, the values of the longer radius portion and delivery ratio of non-circular rotor-type flow meters can be made higher than those of the corresponding factors in comparative prior art flow meters and thus, the sensibility of the non-circular rotor-type flow meters can be substantially improved over that of the prior art flow meters.

| | Flow meters employing conventional rotor tooth forms | Flow meters employing rotor tooth forms of the invention |
| --- | --- | --- |
| Longer radius ration | 69.5 | 75.0 |
| Delivery ratio | 55.6 | 64.8 |
| Flow rate range $\left(=\frac{\text{maximum}}{\text{minimum}}\right)$ | × 10 | × 35 |

Only several embodiments of the invention have been shown and described in detail it will be understood that the same are for illustration purpose only and should not to be taken as a definition of the invention, reference being had for this purpose to the appended claims.

What is claimed is:

1. In a flow meter, driving pump or the like, the combination of a first gear rotor and a second gear rotor, both mounted for rotation about their centers operatively positioned with their teeth in mesh for all angular positions of each of said gears, in which one of said rotors has a pitch circle defined by a curve obtained so that at the polar coordinates, when $a$, $b$ and $c$ represent numbers relating to the length, $d$ represents a positive number from zero to 1 and $x$ represents an independent variable, and the length of a radius vector $\rho_1$ is obtained by the following formula:

$$\rho_1 = a + \cos 2x \left( \frac{c \cdot d^2 |\sin^2 2x|}{(1 - d^2 \cos^2 2x)^2} - b \right) \quad (1)$$

and assuming that $\mu$ represents the number determined by $a$, $b$, $c$, and $d$, then the directional angle $\theta_1$ of the vector $\rho_1$ is obtained by the following formula:

$$\theta_1 = \frac{1}{\mu} \int \frac{dx}{\rho_1} \quad (2)$$

and the other rotor has a pitch circle engaging said first-mentioned pitch circle and defined by a second curve so obtained that at the polar coordinates, the length of a radius vector $\rho_2$ is obtained by the following formula:

$$\rho_2 = a - \cos 2x \left( \frac{c \cdot d^2 |\sin^2 2x|}{(1 - d^2 \cos^2 2x)^2} - b \right) \quad (3)$$

and the direction angle $$\theta_2 = \frac{1}{\mu} \int \frac{dx}{\rho_2} \quad (4)$$

and the tooth form on the longer and shorter radius portions of each of said pitch circles having a greater tool pressure angle than that of the tooth form on the intermediary portion between said longer and shorter radius portions along the pitch circle.

2. The structure as claimed in claim 1 in which the addendum of the tooth form on said longer radius portion has a greater curvature than that of the rest along said pitch circle and is increased, and the limit of the maximum meshing pressure angle of the tooth form on said intermediary portion is maintained below a predetermined limit value.

3. The structure as set forth in claim 1, in which backlash grooves are provided in selected faces of the teeth on said shorter radius and intermediary portions along the pitch circle of the rotor facing said longer radius portion and extending in the axial direction of the rotor.

4. The structure as set forth in claim 1, in which selected areas on the faces of the teeth on said rotor portions extending in the axial direction of the rotor comprises a material of relatively high hardness.

5. The structure as set forth in claim 1, in which selected areas on the faces of the teeth on said rotor portions extending in the axial direction of the rotor are hard treatment.

6. The structure as set forth in claim 1, in which the body of said teeth on the elliptic rotor comprises a light weight material.

7. The structure as set forth in claim 1, including a first group of elliptic rotors coaxially mounted on a first common shaft and a second group of elliptic rotors coaxially mounted on a second common shaft for intermeshing the rotors of the first group, respectively.

8. The structure as set forth in claim 1, in which the center line of the teeth on the rotor is in plus profile-shift phase on said longer radius portion and in minus profile shift phase on said shorter radius portion with respect to the pitch circle of the rotor, respectively.

9. The structure as set forth in claim 8, in which said profile shift progresses gradually.

10. The structure as set forth in claim 8, in which said profile, shift progresses stepwise.

11. The structure as set forth in claim 1, in which the module of the teeth on said longer and shorter radius portions along the pitch circle of the rotor is greater than that of the teeth on said intermediary portion along the pitch circle.

12. The structure as set forth in claim 1 in which the teeth on said shorter radius and intermediary portions along the pitch circle of the rotor are formed with backlash grooves facing said longer radius portion for prevention of trapping.

13. The structure as set forth in claim 1, in which a plurality of said elliptic rotors each having longer and shorter radius portions and an intermediary portion between said longer and shorter radius portions along the pitch circle are mounted on respectively associated shafts in intermeshing relationship for rotation within a predetermined center-to-center distance.

* * * * *